Figure 1:
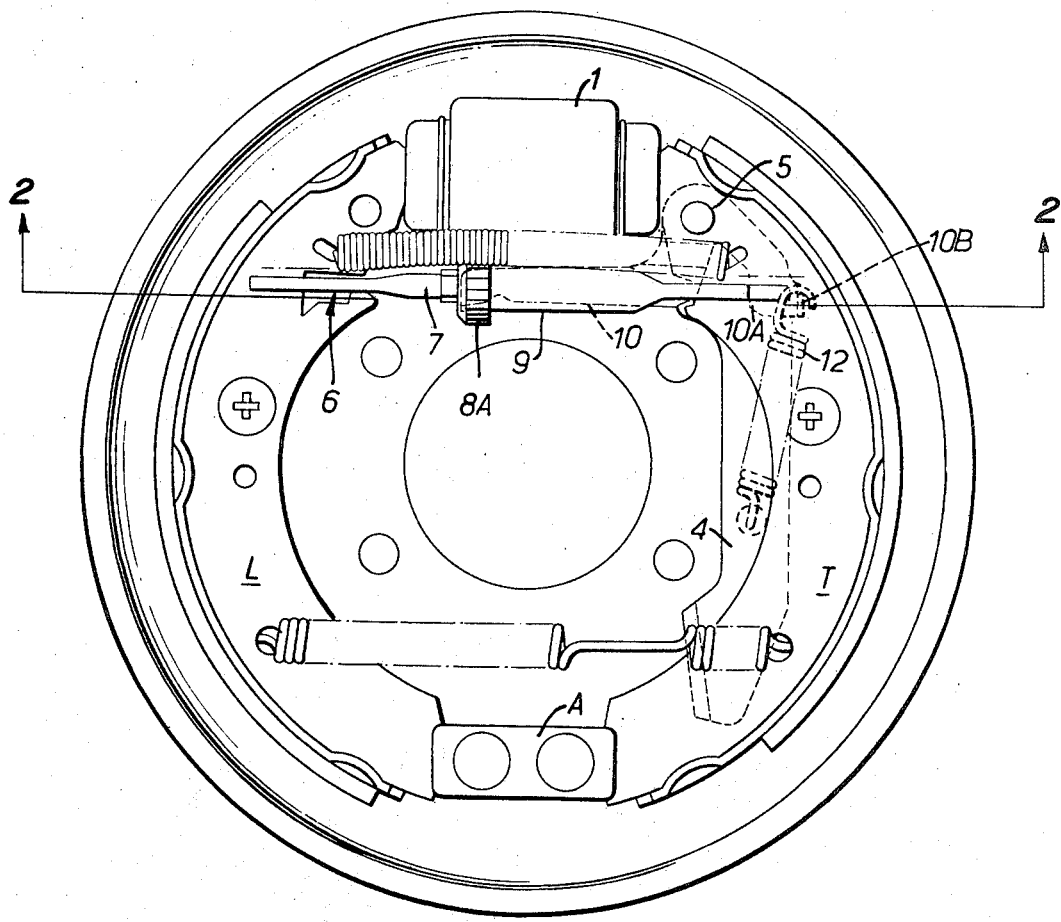

United States Patent [19]
Margetts

[11] 3,794,145
[45] Feb. 26, 1974

[54] VEHICLE BRAKE ADJUSTER
[75] Inventor: Hugh Grenville Margetts, Birmingham, England
[73] Assignee: Girling Limited, Birmingham, England
[22] Filed: Aug. 23, 1971
[21] Appl. No.: 173,954

[30] Foreign Application Priority Data
Aug. 24, 1970 Great Britain.................... 40573/70

[52] U.S. Cl....................... 188/79.5 P, 188/196 BA
[51] Int. Cl....................... F16d 65/56, F16d 51/70
[58] Field of Search... 188/79.5 B, 79.5 K, 79.5 GC, 188/79.5 GT, 79.5 P, 106 A, 196 BA

[56] References Cited
UNITED STATES PATENTS
2,292,017   8/1942   Smith............................ 188/79.5 B
3,554,332   1/1971   Harrison...................... 188/79.5 GC
FOREIGN PATENTS OR APPLICATIONS
1,191,320   5/1970   Great Britain.................. 188/79.5 P Primary Examiner—Duane A. Reger
Attorney, Agent, or Firm—Scrivener, Parker, Scrivener & Clarke

[57] ABSTRACT

An auto-adjuster for an internal shoe drum brake having power and manual brake applying means, the latter working through a strut comprising relatively rotatable screw threaded members, comprises a spring biased pawl pivotally mounted on one brake shoe on the same pivot as a handbrake applying lever, the pawl spring exerting sufficient force to rotate the pawl to effect adjustment when the strut is relieved of the shoe return spring force, but insufficient force to effect adjustment when the strut is loaded by operation of the hand brake mechanism. The same spring also yieldingly biases the pawl laterally into engagement with the ratchet wheel, allowing the pawl to spring over the ratchet teeth when required.

5 Claims, 3 Drawing Figures

VEHICLE BRAKE ADJUSTER

This invention relates to internal shoe drum brakes of the class having a pair of expansible brake shoes, shoe return spring means for retracting said shoes, power actuated service brake means for expanding said shoes, manually actuated auxiliary brake means for expanding said shoes, a strut of adjustable length which transmits manually applied loads between said shoes, said service brake means being operable to relieve said strut of load, said strut comprising a pair of relatively rotatable members screw threaded together, and pawl and ratchet means for effecting relative rotation of said members to lengthen said strut in response to excess travel of said shoes upon actuation of said service brake means. Such brakes are referred to herein and in the appended claims as being "of the class specified."

It is a primary object of the invention to provide a brake of the class specified having a simple but effective arrangement for automatically effecting adjustment of the strut, in response to actuation of the service brake means, but not of the manually actuated means.

It is a further object of the invention to provide a brake of the class specified, in which, in the interests of economy and simplicity, a single spring performs the seprate functions of biassing the pawl to move in a direction to effect adjustment when required, and also to yieldingly bias the pawl against the ratchet wheel.

In accordance with a primary feature of the invention, a brake of the class specified comprises a common pivotal mounting means for mounting a handbrake applying lever forming part of the auxiliary brake means and the pawl upon one of the brake shoes. Furthermore, the pawl is subject to the action of a pawl spring which constantly urges the pawl in a direction to effect adjustment, the force applied by the spring to the pawl being intermediate that required to effect relative rotation of said members when said strut is loaded by said shoe return springs and that required when said strut is relieved of load by actuation of said service brake means.

According to another feature of the invention, the pawl is mounted on said mounting means in a manner permitting said pawl to rock about an axis transverse to that of said pivotal mounting means, and the pawl spring biases the pawl about said rocking axis into engagement with said ratchet wheel.

Figure 2:
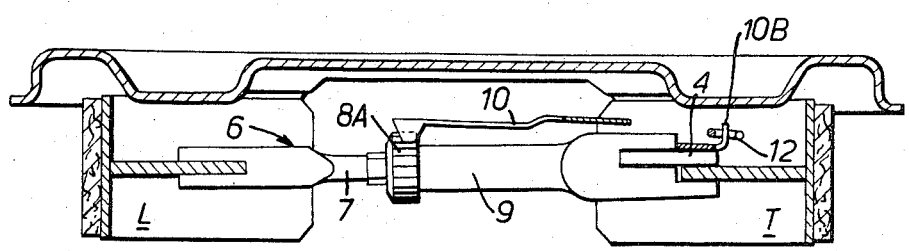
Figure 3:
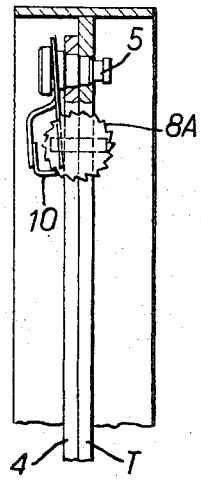

In order that these and other features of the invention may be more fully understood, there will now be described a drum brake constructed according to the invention, reference being made to the accompanying drawings, in which:

FIGS. 1, 2 and 3 are a side, plan and partial end elevation of one form of drum brake in accordance with the invention.

The brake shown in the drawings comprises a back plate B, a pair of brake shoes T and L, a fixed abutment A and a double ended slave cylinder 1 for applying the service braking force to the adjacent tips of the brake shoes L and T respectively.

The auxiliary (parking) brake load is applied by a lever 4, pivoted to the trailing shoe T at a fulcrum pin or pivoted mounting means 5. The lever also engages a strut 6 comprising a screw 7, a nut 8 formed with a ratchet wheel 8A and a tube 9. Arranged for cooperation with the ratchet wheel 8A is a pawl 10 also pivoted to trailing shoe T by the fulcrum pin 5.

The pawl has clearance and freedom to rock on the pin about an axis transverse to the pin, as best seen in FIG. 3. The pawl has a shoulder 10A abutting the adjacent end of the female strut part 9 and a projecting lug 10B for attachment thereto of a pawl spring 12, in the form of a coil tension spring whose opposite end is anchored either to the shoe T or, as shown, to a point on the backplate of the brake. The spring 12 tends to rotate the pawl 10 in an a clockwise direction (as viewed in FIG. 1) about the pin 5, this being the direction of movement in which stroking of the pawl effects adjustment of the strut 6 to compensate for shoe lining wear.

The spring 12 also tends to rock the pawl to the position shown in FIG. 3, so as to press the tip of the pawl towards the ratchet wheel 8A.

The couple applied by the spring 12, acting through the pawl 4, holds the strut in contact with the left hand (or leading) shoe L.

During service brake operation, when the strut 6 is relieved of the return spring load as the shoes are moved apart by the action of slave cylinder 1, the pawl is rotated by the spring 12, and if adjustment is required, the pawl tip picks up a tooth on the ratchet wheel and rotates it to effect a degree of adjustment. On brake release, the pawl can ride over the crests of the ratchet tooth by rocking against the action of the spring 12.

Upon actuation of the handbrake, the actuating force is transmitted through the strut to create a high frictional resistance to relative rotation of the strut parts, this resistance being too high for the spring 12 which therefore deflects, allowing the pawl shoulder 10A to separate from the end of the strut, and no adjustment is effected.

Thus, in the above described brake the pawl and handbrake actuating lever are mounted for rotation about a common axis, and a single pawl spring acts to bias the pawl in a direction to effect adjustment and to provide a yielding force maintaining the pawl in contact with the ratchet wheel, the pawl being rockable about an axis transverse to its axis of rotation for this purpose.

The spring further acts to keep the adjustment strut in contact with the further brake shoe (L), through the intermediary of the pawl, which acts directly on one end of the strut 6.

I claim:

1. A shoe drum brake including a pair of brake shoes, service brake means for spreading apart the corresponding ends of said shoes to apply the brakes, shoe return springs biasing said shoes to brake release positions, an extensible strut extending between said shoes and including a ratchet wheel which may be rotated to extend said strut, a pawl engageable with said ratchet wheel to rotate the same, and a hand brake applying lever forming part of a manually actuated auxiliary brake means, common pivoted mounting means for mounting said lever and said pawl on one of said brake shoes for pivotal movement relative thereto, said pawl being mounted on said common mounting means in a manner permitting said pawl to rock about an axis transverse to that of said mounting means, pawl spring means constantly urging said pawl to pivot in a sense to effect adjustment of said strut and biasing means biasing said pawl about said rocking axis into engagement with said ratchet wheel, said pawl spring means exerting on said pawl a force intermediate that required to effect adjustment when said strut is loaded by said shoe return springs and that required when said strut is relieved of load by actuation of said service brake means.

2. A brake as claimed in claim 1, wherein said pawl is mounted on said common mounting means in a manner permitting said pawl to rock about an axis transverse to that of said mounting means, and said pawl spring biases said pawl about said rocking axis into engagement with said ratchet wheel.

3. A brake as claimed in claim 1 wherein said pawl spring means constitutes said biasing means and biases said pawl about said rocking axis into engagement with said ratchet wheel.

4. A brake according to claim 3, wherein said pawl has a portion engaging said strut and resilient biasing means biases said pawl portion in such a manner as to urge said strut against the other one of said pair of brake shoes.

5. A brake according to claim 4, wherein said pawl spring constitutes said resilient biasing means and biases said pawl portion to urge said strut against the other one of said pair of brake shoes.

* * * * *